Patented June 12, 1934

1,962,495

UNITED STATES PATENT OFFICE 1,962,495

GLASS AND PROCESS OF MAKING SAME

Elbert E. Fisher, St. Louis, Mo., assignor to National Pigments and Chemical Company, St. Louis, Mo., a corporation of Missouri No Drawing. Application February 7, 1931, Serial No. 514,313

7 Claims. (Cl. 106—36.1)

This invention relates generally to the production of glass, and particularly to the improvement of the characteristics of a batch of glass forming material by augmenting the effect of a fluxing material and at the same time reducing the solubility of the finished glass.

Various materials have heretofore been incorporated with the essential glass forming materials of a batch, whereby the solubility is said to have been reduced, so that the finished glass is of greater durability and is not subject to weathering. Solubility of glass is particularly disadvantageous in bottles, and although the solubility of such glass as is adapted for use in the manufacture of bottles is unnoticed under ordinary circumstances, such glasses as have heretofore been used have been found to deteriorate considerably when exposed to certain substances at a temperature slightly in excess of normal. Among the efforts which have been heretofore made to overcome the solubility of glass and at the same time decrease the fusing temperature of the batch, are the methods disclosed in United States Patents Nos. 1,665,693 and 1,665,694, in which quantities of barium sulfate and barium sulfide are added to the batch as primary ingredients and have the effect of improving the characteristics aforementioned. Although by the use of such barium sulfate and barium sulfide, the characteristics of the resulting glass have been substantially improved over what was theretofore known, the results obtained by the use of barium sulfate and barium sulfide cannot be said to have been as complete as desired, particularly as to decrease of solubility and time of fluxing.

The object of this invention, generally stated, is to provide a glass in which solubility is substantially eliminated.

Another object of this invention is to provide a process of making glass wherein the effect of the fluxing material is substantially increased.

Another object of this invention is to provide a process of making glass whereby the solubility of certain oxides in the resulting glass is prevented.

A more specific object of this invention is to provide a process of making glass wherein the reaction between certain materials heretofore known is substantially augmented.

A more specific object of this invention is to provide a process of making glass wherein a trace of titanium oxide is added to the batch.

Other objects will become apparent to those skilled in the art when the following description is read.

Although this invention is applicable to the production of glass for all uses, it is particularly adaptable to the production of bottle glass and shall be so described hereinafter.

It is well known that glasses containing a substantial portion of sodium silicate and other soluble oxides are subject to deterioration when exposed to the atmosphere for long periods, as well as when exposed to the action of acids and other strong chemicals. A typical batch formula for bottle glass as heretofore practiced is:

| | |
|---|---|
| Sand | 100 |
| Soda ash | 36 |
| Limestone | 27 |
| Solubility | 0.7 |

In the manufacture of bottle glass in accordance with the methods disclosed in United States Patents Nos. 1,665,693 and 1,665,694, the following is a typical batch formula:

| | |
|---|---|
| Sand | 100 |
| Soda ash | 35 |
| Limestone | 27 |
| Barium sulfide } Barium sulfate } | 3 |
| Solubility | 0.6 |
| Fluxing time decrease | 20 per cent |

Although it is apparent that the formula last given constitutes a distinct improvement over the results obtained in the preceding formula, it is apparent that the resulting glass is susceptible of considerable improvement, and especially is this true as regards the solubility thereof. By the introduction of a mixture of barium sulfate and barium sulfide as primary ingredients of a batch, the solubility of a resulting glass was reduced from 0.7 to 0.6%, and there was a corresponding reduction of the weight of soda ash necessary in the production of the batch. It is apparent that with the reduction of the weight of soda, ash, a corresponding reduction in the weight of sodium silicate, which is created in the finished glass, is imminent, and furthermore, since sodium silicate, as is well known, is the principal ingredient in glass which is subject to the attack of water and chemicals, it seems that the barium compounds, by making possible a reduction in the necessary weight of soda ash, have rendered the glass immune, to a large extent, to the deleterious action of water and chemicals. Furthermore, by the inclusion of the barium compounds in the batch, the time of fluxing was decreased 20%.

This invention may advantageously be employed in connection with the processes disclosed in United States Patents Nos. 1,665,693 and 1,665,694 for augmenting the apparent effect of the barium compounds. As an illustrative embodiment of this invention, the following batch formula may be employed with advantage:

| | |
|---|---|
| Sand | 100 |
| Soda ash | 25 |
| Limestone | 27 |
| Cullet | 100 |
| Barium sulfate ⎫<br>Barium sulfide ⎬<br>Titanium oxide ⎭ | 10.25 |
| Solubility | .006 |
| Fluxing time decrease | 35 per cent |

It is apparent that this invention contemplates the addition of such an agent as titanium oxide to the glass forming batch. A very small quantity of the titanium oxide is, however, sufficient to accomplish the desired results, since where the portions of barium sulfate and barium sulfide have heretofore been 1600 parts of the former to 400 parts of the latter, only from 1 to 10 parts of titanium oxide are needed to reduce the solubility of the glass from 0.6% to .004%, and at the same time reduce the time of fluxing an additional 15%; the effect of the titanium oxide can hardly be considered as a chemical reaction. Accordingly, the action of the titanium oxide may be considered as a catalytic action, and the effect thereof is to accelerate or augment the effect of the barium compounds heretofore employed. In the above formula, therefore, the following proportions may be employed:

| | |
|---|---|
| Barium sulfate | 1600 Parts |
| Barium sulfide | 400 Parts |
| Titanium oxide | 1–10 Parts |

The titanium oxide is preferably added to the batch in a free form as an initial ingredient thereof, but it is within the scope of this invention to add such a catalytic agent to the batch in a combined form and at any suitable time. However, since the addition of titanium oxide produces a marked decrease in the time of fluxing, it is most preferable that the titanium oxide be added during the dry mixing of the glass forming materials, so that advantage may be taken of the maximum effect thereof.

The addition of such a catalytic agent, such as, for instance, titanium oxide, to a glass forming batch, thus produces a glass, the solubility of which is reduced to a negligible value, and the glass resulting may readily be decolorized by the use of selenium or manganese in a manner well known in the art. With the use of the illustrative embodiment hereinbefore set forth, in which, according to the text of the patents hereinbefore referred to, the use of a reducing agent with the barium compounds is unnecessary; selenium and cobalt oxide may readily be added for neutralizing the color of the batch, so that a clear, transparent glass is formed.

While the action of the titanium oxide has been hereinbefore described as a catalytic action, it is to be understood that the theory advanced is by no means certain, the theory of action advanced having been merely to facilitate the disclosure, for it is apparent that the invention is not limited by the presence of any theoretical condition.

It is apparent that the invention is susceptible of use with many materials other than those hereinbefore specifically referred to, and, accordingly, it is to be distinctly understood that the terms "barium sulfate", "barium sulfide", etc. have been used in their illustrative and not in their limiting sense. Furthermore, it is to be understood that the use of such sub-processes as do not depart from the spirit of this invention are, although not specifically referred to herein, contemplated by and within the scope of the appended claims.

Having thus described the invention what is claimed is:

1. A sand, soda, lime, glass batch comprising as initial ingredients, a barium compound, and a relatively small quantity of titanium oxide.

2. A sand, soda, lime, glass batch comprising as initial ingredients, a barium compound, and titanium oxide in an amount 0.05–0.5% of the barium compound.

3. An ingredient for a glass batch, a mixture comprising, barium sulphate, barium sulphide, and 0.05–0.5% titanium oxide.

4. A sand, soda, lime glass batch comprising, as initial ingredients, barium sulphate and a relatively small quantity of titanium oxide.

5. A sand, soda, lime glass batch comprising, as initial ingredients, barium sulphide and a relatively small quantity of titanium oxide.

6. In the art of making glass, the process comprising, fusing substantial portions of sand, soda, lime, and a barium compound together with a relatively small quantity of titanium oxide.

7. In the art of making glass, the process comprising, fusing together substantial proportions of sand, soda, lime, a barium compound and titanium oxide, the titanium oxide being in the proportion of 0.05–0.5% of the barium compound.

ELBERT E. FISHER.